US012584624B1

(12) United States Patent
Rodriguez

(10) Patent No.: US 12,584,624 B1
(45) Date of Patent: Mar. 24, 2026

(54) ILLUMINATED RAILING SYSTEM

(71) Applicant: Melchor Rodriguez, Chattanooga, TN (US)

(72) Inventor: Melchor Rodriguez, Chattanooga, TN (US)

(*) Notice: Subject to any disclaimer, the term of this patent is extended or adjusted under 35 U.S.C. 154(b) by 0 days.

(21) Appl. No.: 19/060,096

(22) Filed: Feb. 21, 2025

(51) Int. Cl.
*F21V 33/00* (2006.01)
*F21V 23/00* (2015.01)

(52) U.S. Cl.
CPC .......... *F21V 33/006* (2013.01); *F21V 23/001* (2013.01)

(58) Field of Classification Search
CPC ............................ F21V 33/006; F21V 23/001
USPC ........................................................ 362/125
See application file for complete search history.

(56) References Cited

U.S. PATENT DOCUMENTS

| | | | | |
|---|---|---|---|---|
| 5,492,285 | A | 2/1996 | Hamrick | |
| D462,710 | S | 9/2002 | Babcock | |
| 7,905,233 | B2 | 3/2011 | Hopper | |
| 10,080,693 | B1 | 9/2018 | Scheenstra | |
| 2009/0173354 | A1 | 7/2009 | Gold | |
| 2011/0096533 | A1* | 4/2011 | Sekela | F21V 7/0091 362/225 |
| 2022/0015555 | A1* | 1/2022 | Jain | A47F 11/10 |
| 2022/0233369 | A1 | 7/2022 | Sanders | |
| 2023/0025838 | A1* | 1/2023 | Smith | G06F 1/1605 |

FOREIGN PATENT DOCUMENTS

| | | |
|---|---|---|
| GB | 2563981 | 1/2019 |

* cited by examiner

*Primary Examiner* — Thomas M Sember

(57) ABSTRACT

An illuminated railing system for displaying illuminated bottles on framed shelving includes a frame including a plurality of shelves and a pair of side walls that are coupled to and extend between the plurality of shelves. A plurality of bottles are coupled to the frame. Each bottle of the plurality of bottles is translucent to facilitate visibility through each bottle of the plurality of bottles. A plurality of lights are coupled to the frame. The plurality of lights are coupled to the plurality of bottles wherein the plurality of lights are actuatable to illuminate the plurality of bottles. A plurality of indentations extend into the plurality of shelves wherein the plurality of indentations secure a position of each bottle of the plurality of bottles within the frame.

14 Claims, 10 Drawing Sheets

ILLUMINATED RAILING SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to railings and more particularly pertains to a new railing for displaying illuminated bottles on framed shelving.

(2) Description of Related Art Including Information Disclosed Under 37 CFR 1.97 and 1.98

The prior art relates to railings. More specifically, the prior art relates to deck railings and other safety structures. Such railings are often required on decks, particularly for elevated decks. The prior art discloses lighting assemblies for such railings which can provide increased utility for the railings by illuminating nearby portions of the deck. However, the prior art fails to disclose an illuminated railing assembly that can hold and illuminate a plurality of bottles, such that the plurality of bottles function as decorative illuminated balusters.

BRIEF SUMMARY OF THE INVENTION

An embodiment of the disclosure meets the needs presented above by generally comprising a frame including a plurality of shelves and a pair of side walls that are coupled to and extend between the plurality of shelves. A plurality of bottles are coupled to the frame. Each bottle of the plurality of bottles is translucent to facilitate visibility through each bottle of the plurality of bottles. A plurality of lights are coupled to the frame. The plurality of lights are coupled to the plurality of bottles wherein the plurality of lights are actuatable to illuminate the plurality of bottles. A plurality of indentations extend into the plurality of shelves wherein the plurality of indentations secure a position of each bottle of the plurality of bottles within the frame.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
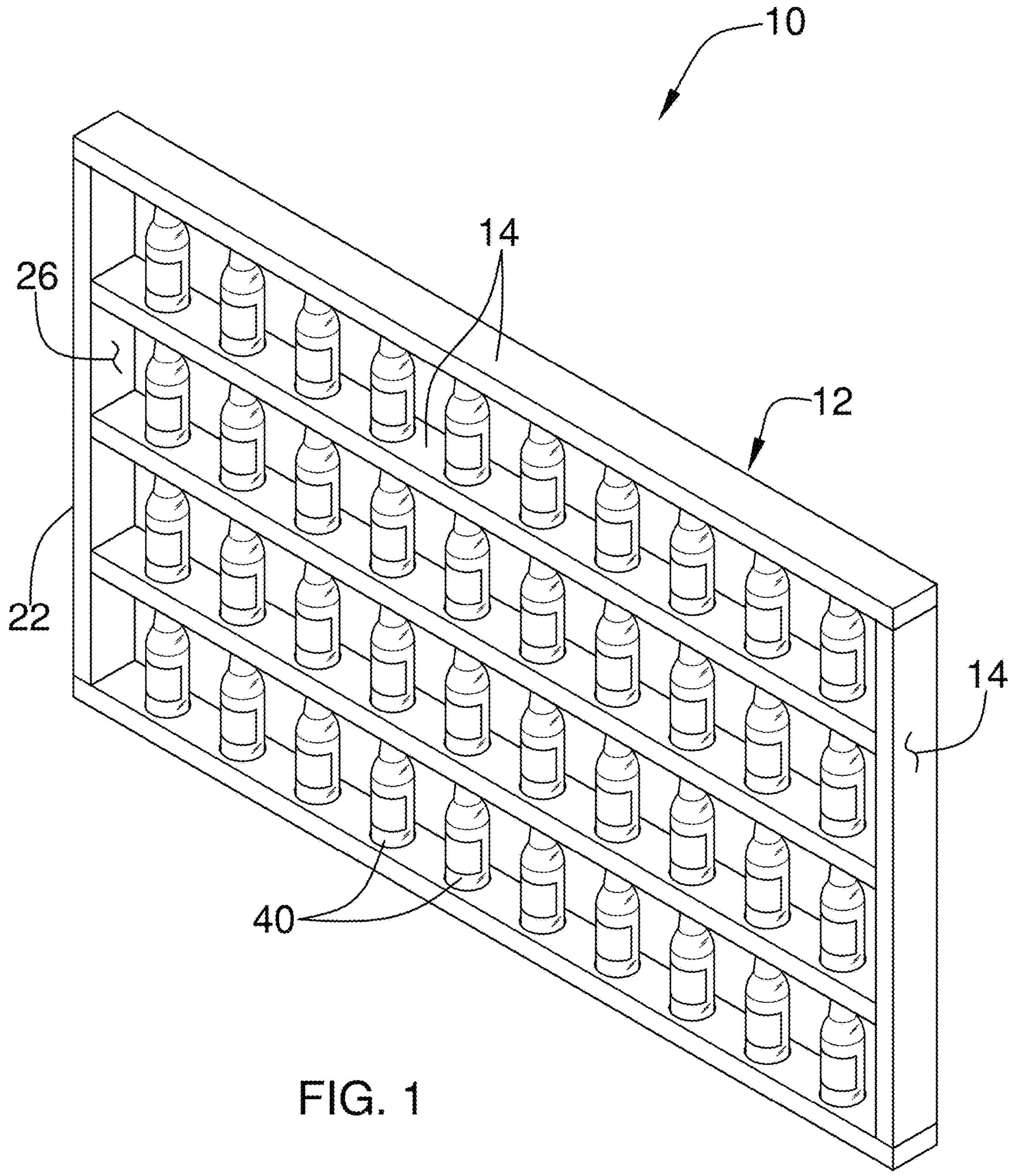
FIG. 1 is an isometric view of an illuminated railing system according to an embodiment of the disclosure.
Figure 2:
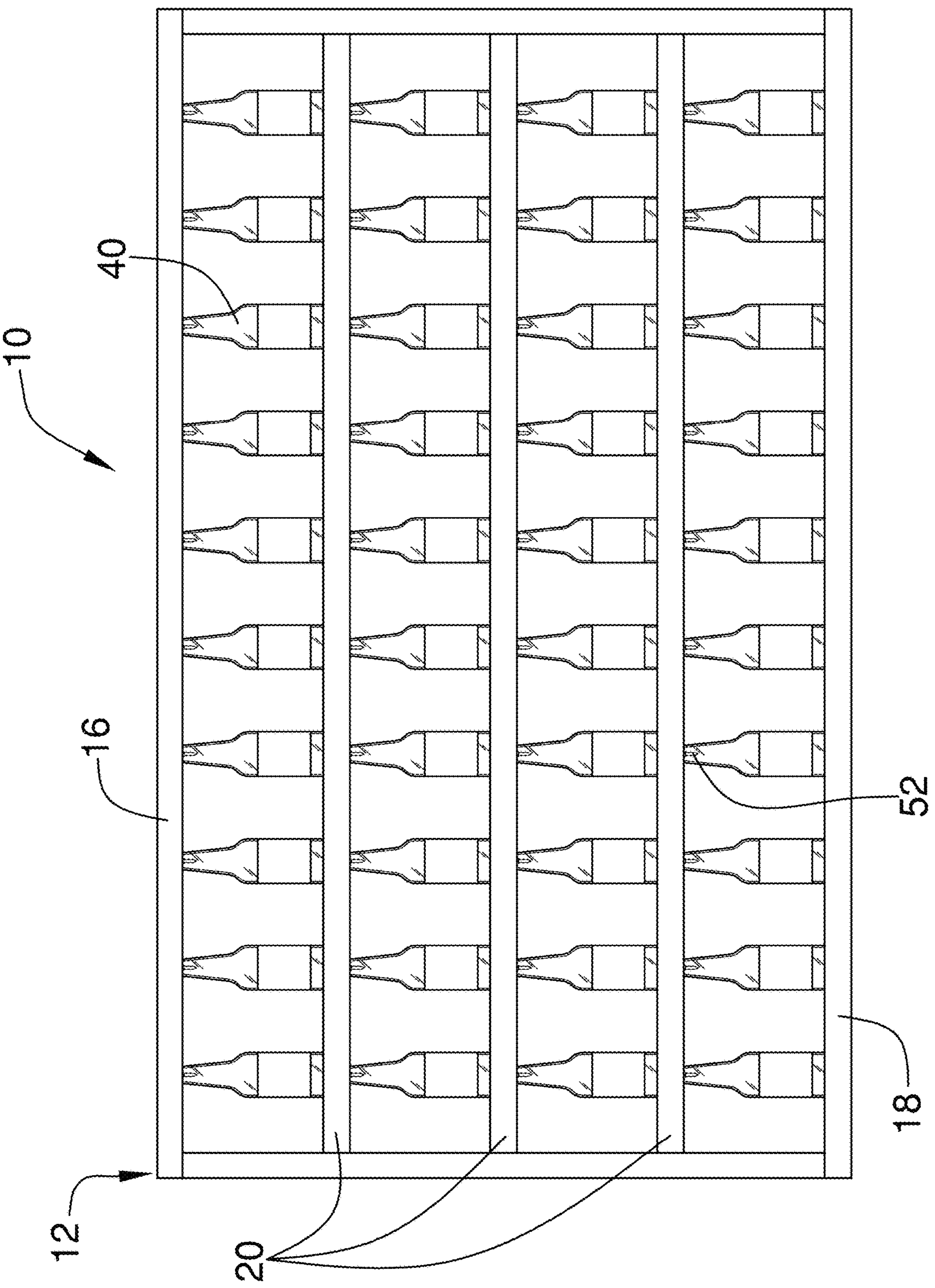
FIG. 2 is a front view of an embodiment of the disclosure.

With reference now to the drawings, and in particular to FIGS. 1 through 10 thereof, a new railing embodying the principles and concepts of an embodiment of the disclosure and generally designated by the reference numeral 10 will be described.

As best illustrated in FIGS. 1 through 10, the illuminated railing system 10 generally comprises a frame 12 having a plurality of shelves 14 and a pair of side walls 22 that are coupled to and extend between the plurality of shelves 14. The plurality of shelves 14 may be spaced from each other by an equivalent distance. The plurality of shelves 14 are generally parallel to each other.

Figure 4:
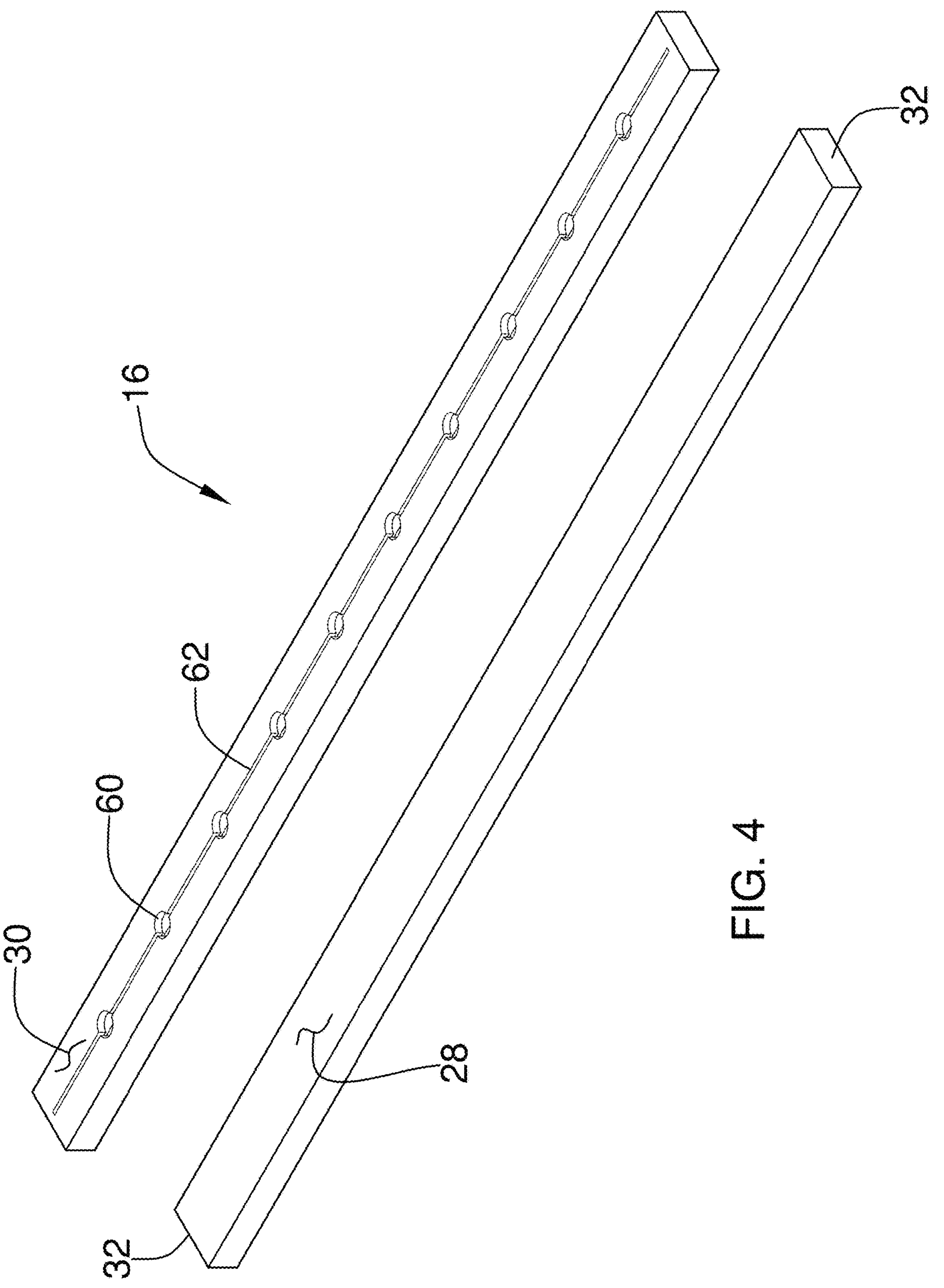
FIG. 4 is a detail view of an embodiment of the disclosure.
Figure 5:
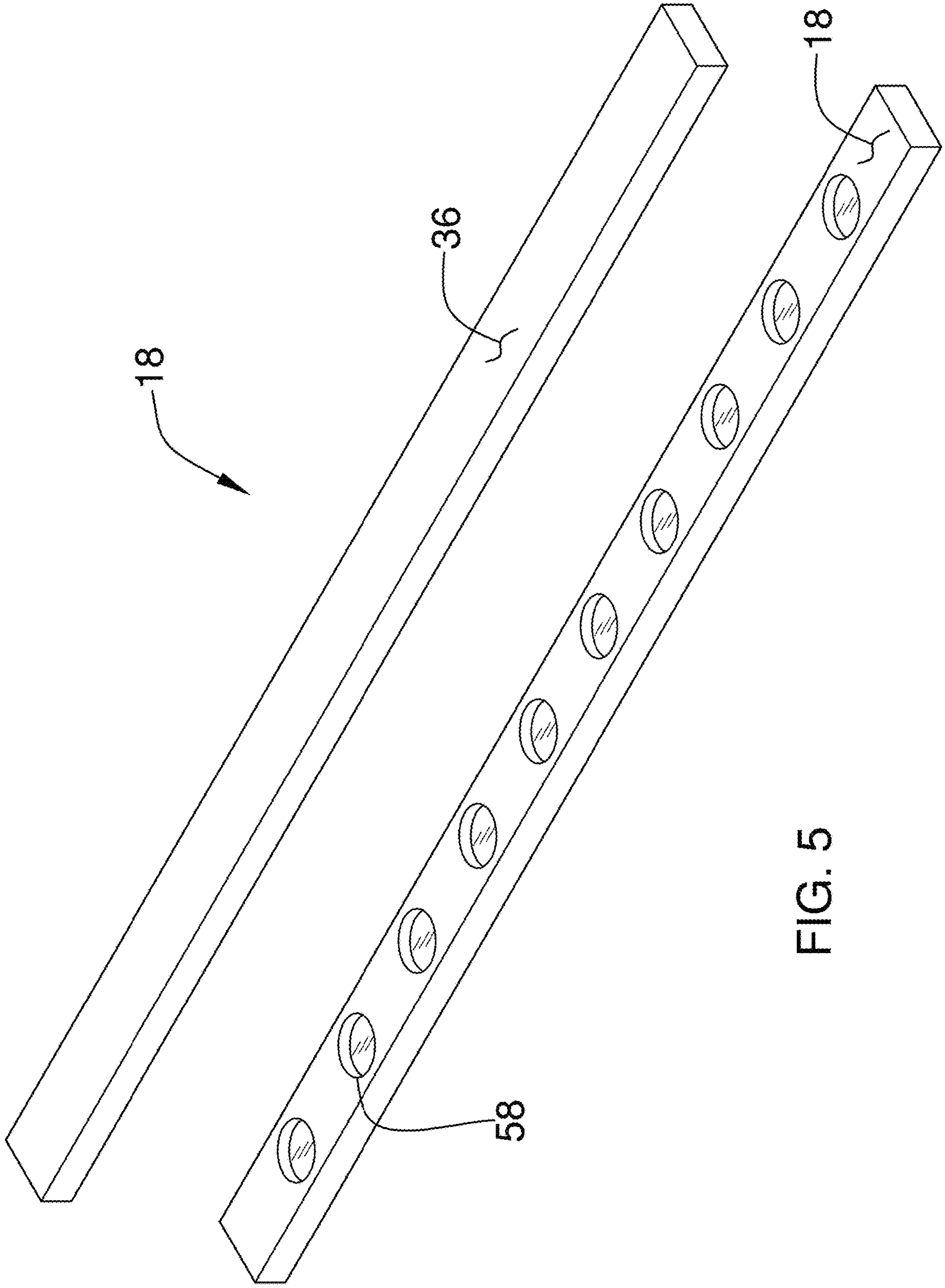
FIG. 5 is a detail view of an embodiment of the disclosure.
Figure 6:
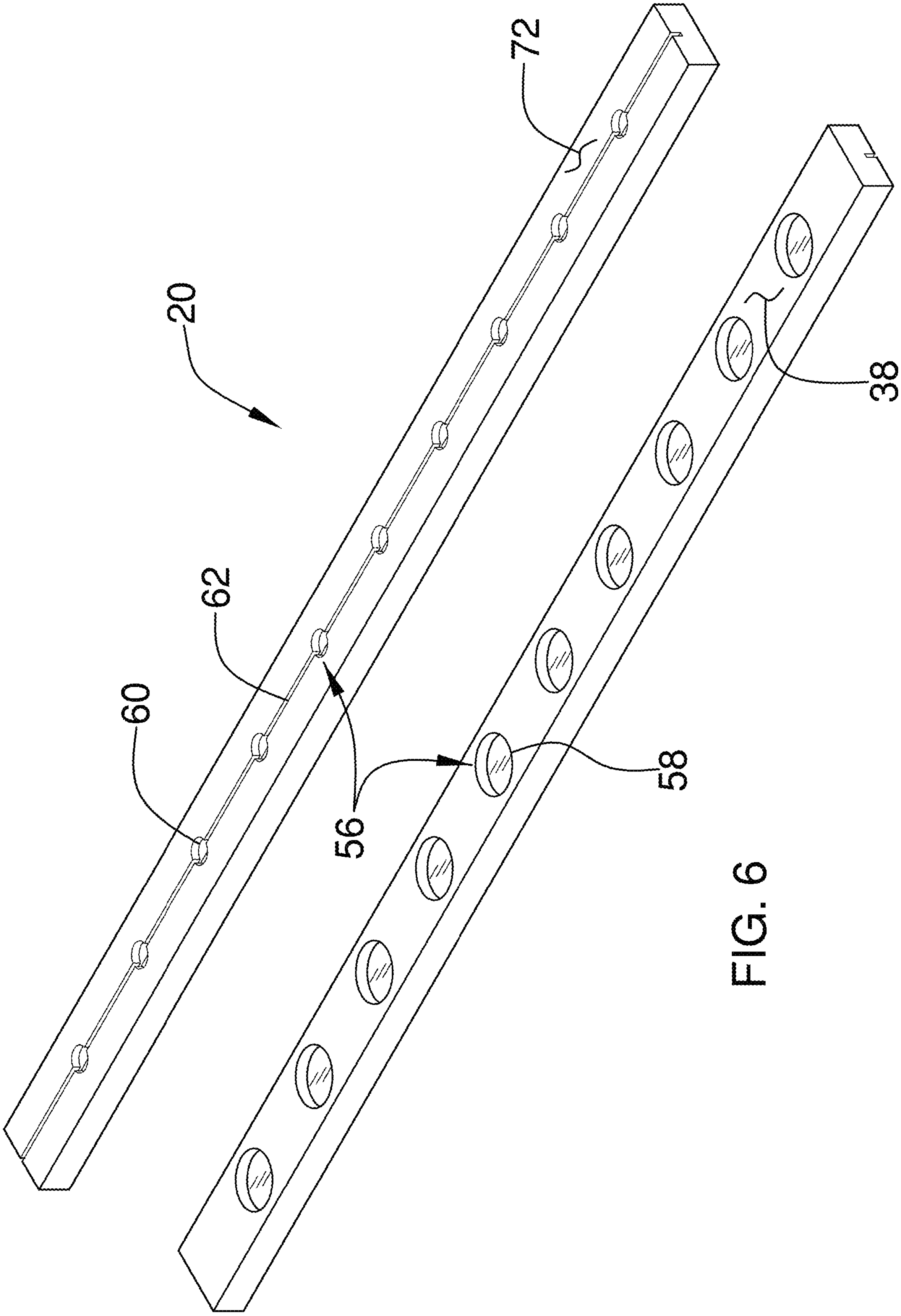
FIG. 6 is a detail view of an embodiment of the disclosure.

A top shelf 16 of the plurality of shelves 14 generally includes an upper surface 28 and a lower surface 66 30, and a pair of opposing lateral ends 32. FIG. 4 provides an example of the top shelf 16. A bottom shelf 18 may have a length that is equal to a length of the top shelf 16, as measured between the pair of opposing lateral ends 32 of the top shelf 16. The bottom shelf 18 has a top surface 66 34 and a bottom surface 36. FIG. 5 provides an example of the bottom shelf 18. A plurality of intermediary shelves 20 may be positioned between the top shelf 16 and the bottom shelf 18. Each intermediary shelf of the plurality of intermediary shelves 20 may have a length is less than the length of the top shelf 16. Each shelf of the plurality of shelves 14 has an upward surface 66 38 and a downward surface 66 72. FIG. 6 provides an example of the plurality of intermediary shelves 20.

Figure 7:
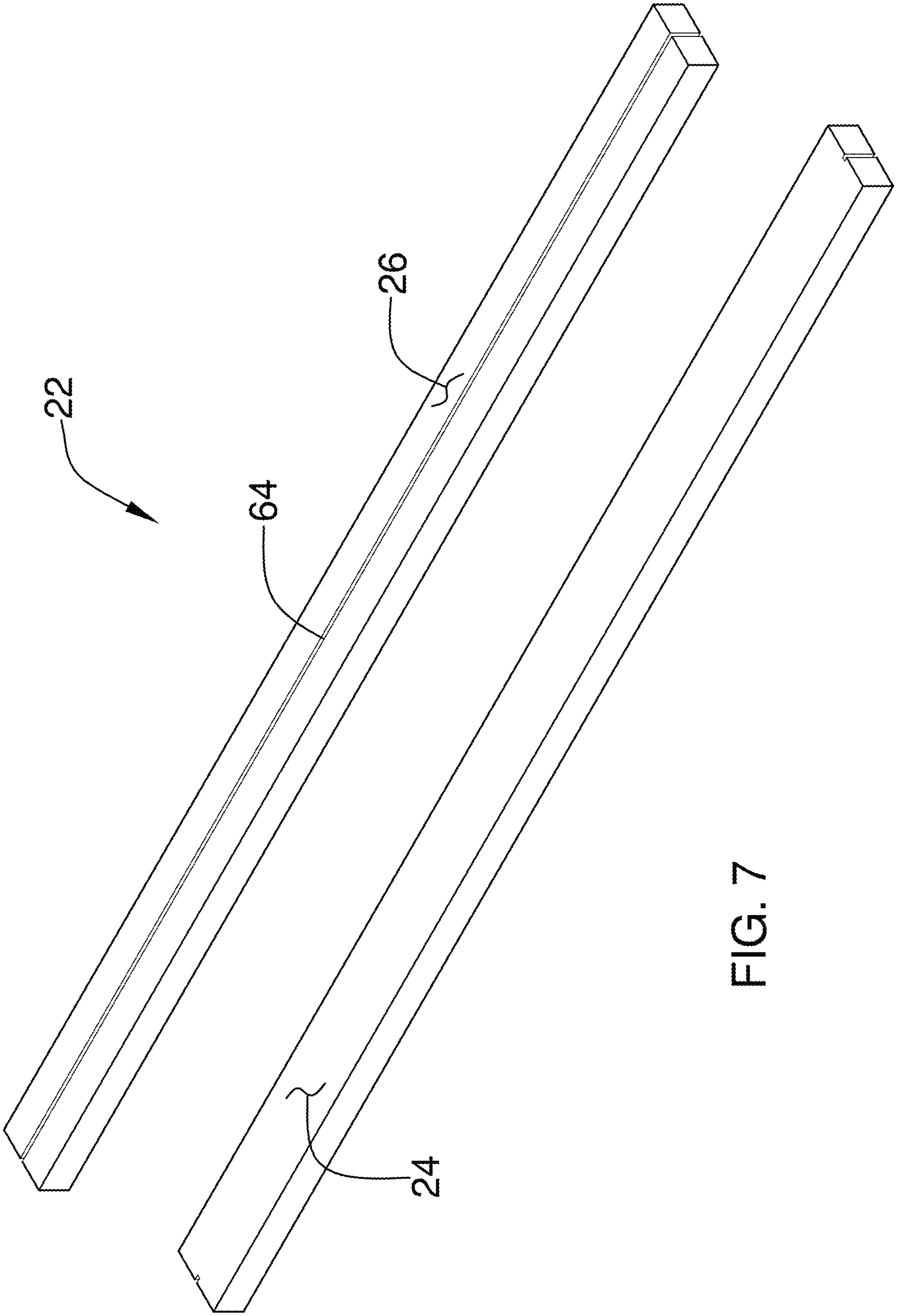
FIG. 7 is a detail view of an embodiment of the disclosure.
Figure 8:
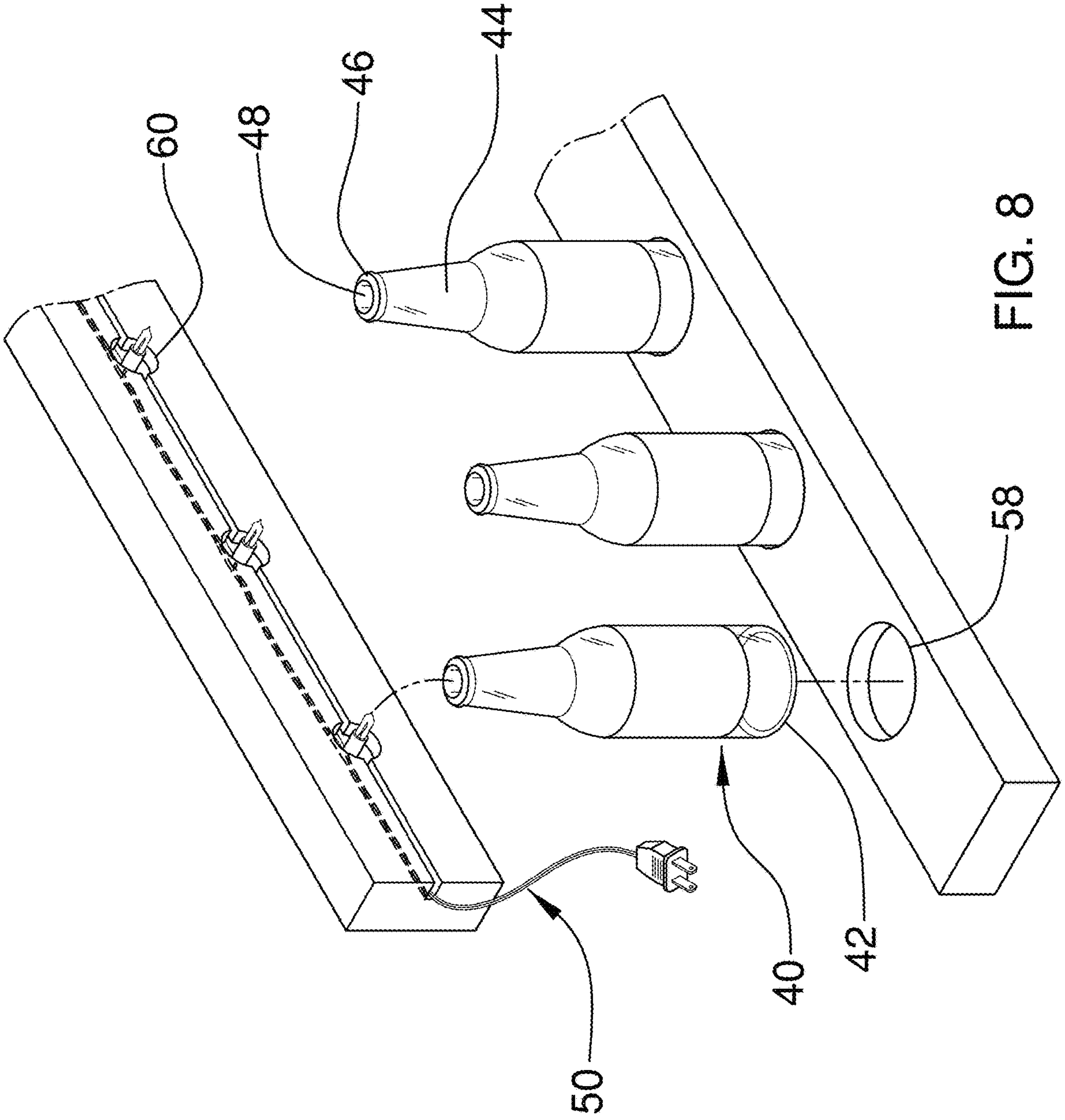
FIG. 8 is a detail view of an embodiment of the disclosure.

The pair of side walls 22 are coupled to and extend between the plurality of shelves 14 to secure a position of the plurality of shelves 14 relative to each other. The pair of side walls 22 may be perpendicular to the plurality of shelves 14. Each side wall of the pair of side walls 22 includes an outer surface 66 24 and an inner surface 66 26. The outer surface 66 24 may be coplanar with a respective opposing lateral end of the pair of opposing lateral ends 32 of the top shelf 16. The inner surface 66 26 is generally coupled to each intermediary shelf of the plurality of intermediary shelves 20. FIG. 7 provides an example of the pair of side walls 22.

A plurality of bottles 40 are coupled to the frame 12. As shown in the Figures, the frame 12 generally surrounds the plurality of bottles 40. Each bottle of the plurality of bottles 40 is translucent to facilitate visibility through each bottle of the plurality of bottles 40. In some embodiments, each bottle of the plurality of bottles 40 may even be transparent. For example, the plurality of bottles 40 may include beer bottles, wine bottles, water bottles, bottles designed for repeated use, bottles designed for disposal after a single use, or any other bottle.

Each bottle of the plurality of bottles 40 includes a base wall 42 and a peripheral wall 44 that extends upwardly from the base wall 42. The peripheral wall 44 may have an upper edge 46 that defines an opening 48 into each bottle of the plurality of bottles 40. Each bottle of the plurality of bottles 40 typically has a height is complementary to a distance between adjacent shelves of the plurality of shelves 14 wherein each bottle of the plurality of bottles 40 extends between the adjacent shelves of the plurality of shelves 14. The height of each bottle of the plurality of bottles 40 is measured between the base wall 42 and the upper edge 46 of the peripheral wall 44.

A plurality of lights 50 are coupled to the frame 12. The plurality of lights 50 are actuatable to illuminate the plurality of bottles 40. For example, each light of the plurality of lights 50 may include a bulb 52. The bulb 52 is generally smaller than the opening 48 extending into a respective bottle of the plurality of bottles 40 wherein the bulb 52 is positioned within the respective bottle of the plurality of bottles 40 through the opening 48. Thus, the bulb 52 is actuatable to illuminate the respective bottle of the plurality of bottles 40. As shown in the Figures, the bulb 52 may be one of a plurality of bulbs 52.

A wire 54 may be coupled to the bulb 52. The wire 54 is electrically conductive wherein the wire 54 is configured to transfer power to the bulb 52 to actuate the bulb 52. In embodiments having a plurality of bulbs 52, the wire 54 generally extends between the plurality of bulbs 52 and may electrically couple the plurality of bulbs 52 to each other.

A plurality of indentations 56 extend into the plurality of shelves 14. The plurality of indentations 56 secure a position of each bottle of the plurality of bottles 40 within the frame 12. As shown in the Figures, the plurality of indentations 56 may be vertically aligned with each other between adjacent shelves of the plurality of shelves wherein the plurality of bottles 40 are vertically aligned with each other within the frame 12. The plurality of indentations 56 may also be equidistantly spaced from each other along a length of each shelf of the plurality of shelves 14 wherein the plurality of bottles 40 are equidistantly spaced from each other along the length of each shelf of the plurality of shelves 14.

More specifically, a plurality of bottom indentations 58 have a shape that is complementary to a shape of the base wall 42 of each bottle of the plurality of bottles 40. The base wall 42 of each bottle of the plurality of bottles 40 is positioned within an associated bottom indentation of the plurality of bottom indentations 58 to secure a position of the base wall 42 of each bottle of the plurality of bottles 40 on the plurality of shelves 14. The plurality of bottom indentations 58 are generally positioned on the top surface 66 34 of the bottom shelf 18. The plurality of bottom indentations 58 may also be positioned on the upward surface 66 38 of each intermediary shelf of the plurality of intermediary shelves 20.

A plurality of top indentations 60 have a shape that is complementary to a shape of the upper edge 46 of the peripheral wall 44 of each bottle of the plurality of bottles 40. The upper edge 46 of the peripheral wall 44 of each bottle of the plurality of bottles 40 is positioned within a respective top indentation of the plurality of top indentations 60 to secure a position of the upper edge 46 of the peripheral wall 44 of each bottle of the plurality of bottles 40 on the plurality of shelves 14. The plurality of top indentations 60 are generally positioned on the lower surface 66 30 of the top shelf 16. The plurality of top indentations 60 may also be positioned on the downward surface 66 72 of each intermediary shelf of the plurality of intermediary shelves 20.

A plurality of channels 62 may extend into the plurality of shelves 14. For example, the plurality of channels 62 may extend through the plurality of top indentations 60 of the plurality of indentations 56. The plurality of channels 62 generally have a size that is complementary to a size of the wire 54 of each light of the plurality of lights 50 because the wire 54 of each light of the plurality of lights 50 is positioned within a respective channel of the plurality of channels 62. The plurality of channels 62 may be positioned on the lower surface 66 30 of the top shelf 16. The plurality of channels 62 may be positioned on the downward surface 66 72 of each intermediary shelf of the plurality of intermediary shelves 20.

Figure 9:
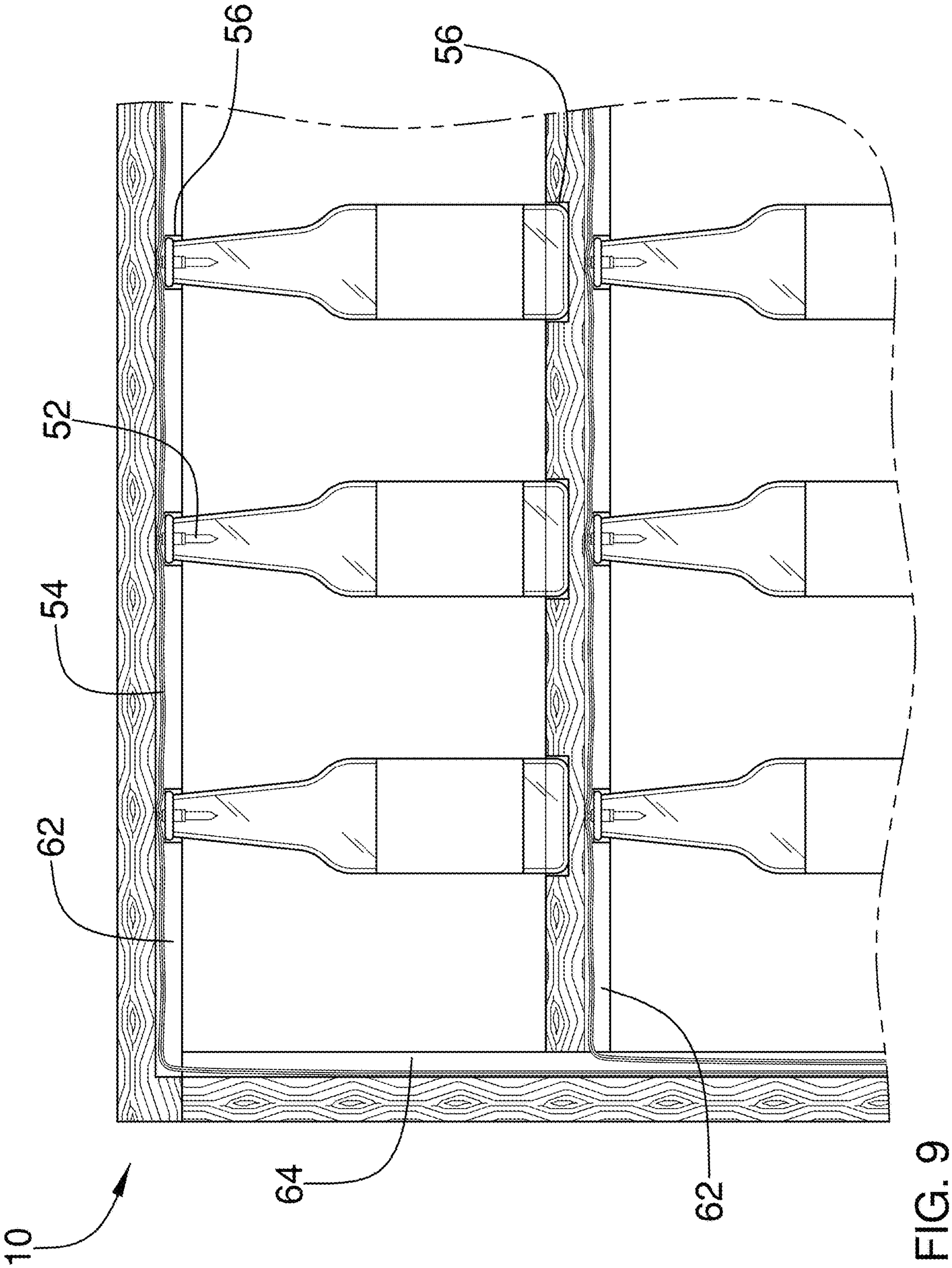
FIG. 9 is a detail view of an embodiment of the disclosure.

A pair of crevasses 64 may extend into the pair of side walls 22 of the frame 12. More specifically, each crevasse of the pair of crevasses 64 is positioned on the inner surface 66 26 of a respective side wall of the pair of side walls 22. Each crevasse of the pair of crevasses 64 has a size that is complementary to a size of the wire 54 of each light of the plurality of lights 50 wherein the wire 54 of each light of the plurality of lights 50 is positioned within a respective crevasse of the pair of crevasses 64 to electrically couple the plurality of lights 50 on each shelf of the plurality of shelves 14 to the plurality of lights 50 on the adjacent shelves of the plurality of shelves 14. For example, as shown in FIG. 9, the plurality of lights 50 on the top shelf 16 may be electrically coupled with the plurality of lights 50 on an uppermost intermediary shelf of the plurality of intermediary shelves 20. The wire 54 may extend through the pair of crevasses 64 downwardly along the frame 12 to the bottom shelf 18, thereby illuminating every bottle of the plurality of bottles 40 within the frame 12.

Figure 10:
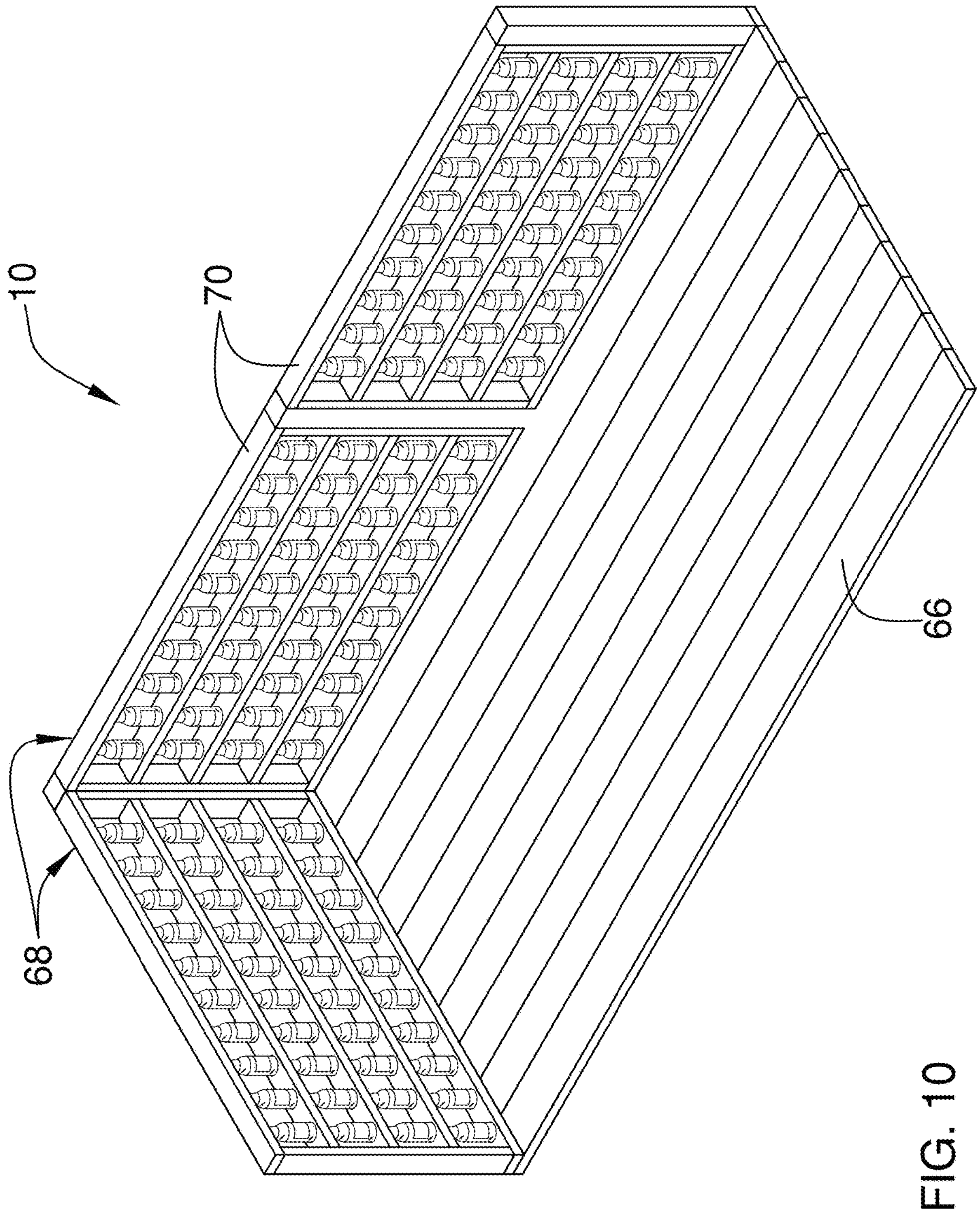
FIG. 10 is an in-use view of an embodiment of the disclosure.

The frame 12 may be one of a plurality of frames that are coupled together. The plurality of frames are generally configured for coupling to a surface 66 wherein the plurality of frames extend upwardly from the surface 66 to define a partition 68 on the surface 66. In such embodiments, the upper surface 28 of the top shelf 16 of the plurality of shelves 14 generally defines a hand rail on the partition 68. As shown in FIG. 10, the partition 68 may be a fence or a deck railing. In such embodiments a height of each frame 12 of the plurality of frames may be measured between the upper surface 28 of the top shelf 16 and the bottom surface 36 of the bottom shelf 18. The height of each frame 12 of the plurality of frames may be between 30.0 inches and 48.0 inches such that the height of each frame 12 of the plurality of frames is configure to comply with the minimum height requirements for deck railings.

In use, the frame 12 is generally positioned on, or coupled to, the surface 66 such that the frame 12 extends upwardly from the surface 66. The plurality of bottles 40 are displayed on the plurality of shelves 14 within the frame 12. When the plurality of lights 50 are actuated, the bulb 52 within each bottle of the plurality of bottles 40 illuminates each respective bottle of the plurality of bottles 40. The plurality of bottles 40 therefore resemble illuminated balusters of the partition 68.

Figure 3:
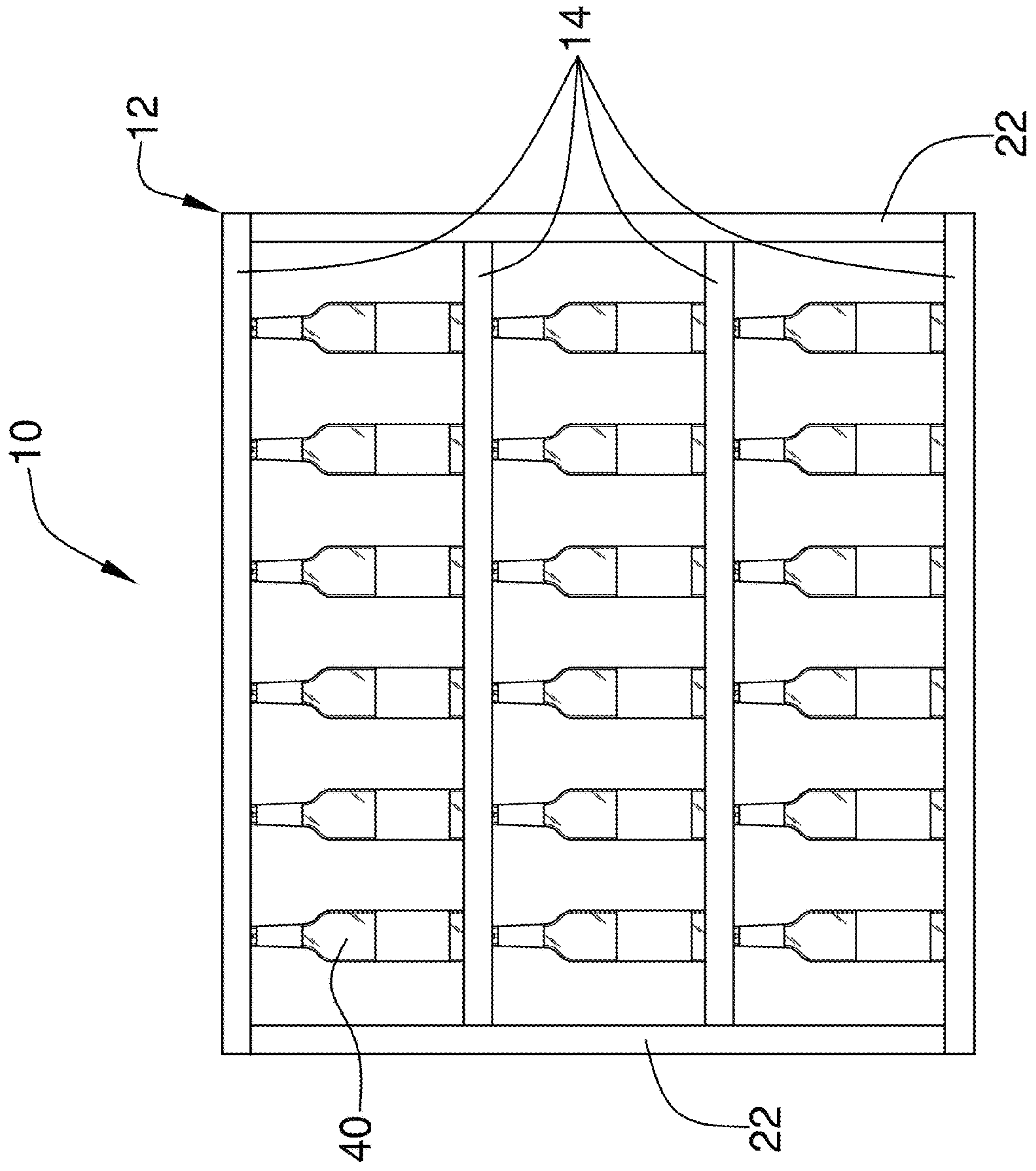
FIG. 3 is a front view of an embodiment of the disclosure.

The plurality of shelves 14 generally include at least the top shelf 16 and the bottom shelf 18. Preferred embodiments also include the plurality of intermediary shelves 20. For example, the plurality of intermediary shelves 20 may include a single shelf positioned between the top shelf 16 and the bottom shelf 18, as shown in FIG. 3. In another example, the plurality of intermediary shelves 20 may include two or more shelves.

As shown in the Figures, the plurality of shelves 14 are generally spaced equidistantly from each other along a vertical axis extending between the top shelf 16 and the bottom shelf 18. In such embodiments, the plurality of bottles 40 may all have an equivalent size, for example because all bottles of the plurality of bottles 40 are beer bottles or wine bottles. In other embodiments, the plurality of shelves 14 may be spaced from each other by varying distances. In those embodiments, the plurality of bottles 40 may have varying sizes. For example, the bottom shelf 18 may be spaced from an adjacent intermediary shelf of the plurality of intermediary shelves 20 by a first distance. The adjacent intermediary shelf of the plurality of intermediary shelves 20 may be spaced from the top shelf 16 by a second distance. The second distance is different than the first distance in these embodiments. The plurality of bottles 40 resting on the bottom shelf 18 may therefore have a different height than the plurality of bottles 40 resting on the adjacent intermediary shelf. Such embodiments may be particularly useful when the plurality of bottles 40 includes different types of bottles, such as a mix of beer bottles and wine bottles.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A railing assembly comprising:

a frame including:

a plurality of shelves including:

a top shelf having an upper surface and a lower surface;

a bottom shelf having a top surface and a bottom surface; and an intermediary shelf being positioned between the top shelf and the bottom shelf, the intermediary shelf having an upward surface and a downward surface; and a pair of side walls being coupled to and extending between the plurality of shelves;

a plurality of bottles being coupled to the frame, each bottle of the plurality of bottles being translucent to facilitate visibility through each bottle of the plurality of bottles;

a plurality of lights being coupled to the frame, the plurality of lights being coupled to the plurality of bottles wherein the plurality of lights are actuatable to illuminate the plurality of bottles; and a plurality of indentations extending into the plurality of shelves wherein the plurality of indentations secure a position of each bottle of the plurality of bottles within the frame, the plurality of indentations including:

a plurality of bottom indentations having a shape being complementary to a shape of a base wall of each bottle of the plurality of bottles wherein the base wall of each bottle of the plurality of bottles is positioned within an associated bottom indentation of the plurality of bottom indentations to secure a position of the base wall of each bottle of the plurality of bottles on the plurality of shelves, the plurality of bottom indentations being positioned on the top surface of the bottom shelf, the plurality of bottom indentations being positioned on the upward surface of the intermediary shelf; and a plurality of top indentations having a shape being complementary to a shape of an upper edge of each bottle of the plurality of bottles wherein the upper edge of the peripheral wall of each bottle of the plurality of bottles is positioned within a respective top indentation of the plurality of top indentations to secure a position of the upper edge of the peripheral wall of each bottle of the plurality of bottles on the plurality of shelves, the plurality of top indentations being positioned on the lower surface of the top shelf, the plurality of top indentations being positioned on the downward surface of the intermediary shelf.

2. The railing assembly of claim 1, wherein the frame is one of a plurality of frames being coupled together, the plurality of frames being configured for coupling to a surface wherein the plurality of frames extend upwardly from the surface to define a partition on the surface.

3. The railing assembly of claim 2, wherein the plurality of shelves are parallel to each other.

4. The railing assembly of claim 3, wherein the pair of side walls are perpendicular to the plurality of shelves.

5. The railing assembly of claim 1, the top shelf further comprising a pair of opposing lateral ends, each side wall of the pair of side walls having an outer surface being coplanar with a respective opposing lateral end of the pair of opposing lateral ends of the top shelf.

6. The railing assembly of claim 1, each side wall of the pair of side walls having an inner surface being coupled to the intermediary shelf wherein the pair of side walls secure a position of the plurality of shelves relative to each other.

7. The railing assembly of claim 1, further comprising a plurality of channels extending into the plurality of shelves wherein the plurality of channels extend through the plurality of top indentations of the plurality of indentations, the plurality of channels having a size being complementary to a size of a wire of each light of the plurality of lights wherein the wire of each light of the plurality of lights is positioned within a respective channel of the plurality of channels, the plurality of channels being positioned on the lower surface of the top shelf, the plurality of channels being positioned on the downward surface of the intermediary shelf.

8. The railing assembly of claim 7, further comprising a pair of crevasses extending into the pair of side walls of the frame wherein each crevasse of the pair of crevasses is positioned on an inner surface of a respective side wall of the pair of side walls, each crevasse of the pair of crevasses having a size being complementary to a size of the wire of each light of the plurality of lights wherein the wire of each light of the plurality of lights is positioned within a respective crevasse of the pair of crevasses to electrically couple the plurality of lights on each shelf of the plurality of shelves to the plurality of lights on adjacent shelves of the plurality of shelves.

9. The railing assembly of claim 1, wherein the intermediary shelf is one of a plurality of intermediary shelves being positioned between the top shelf and the bottom shelf.

10. The railing assembly of claim 1, wherein the plurality of indentations are vertically aligned with each other wherein the plurality of bottles are vertically aligned with each other within the frame.

11. The railing assembly of claim 1, wherein the plurality of indentations are equidistantly spaced from each other along a length of each shelf of the plurality of shelves wherein the plurality of bottles are equidistantly spaced from each other along the length of each shelf of the plurality of shelves.

12. The railing assembly of claim 1, each light of the plurality of lights further comprising a plurality of bulbs, each bulb of the plurality of bulbs being smaller than an opening extending into a respective bottle of the plurality of bottles wherein the bulb is positioned within the respective bottle of the plurality of bottles through the opening whereby each bulb of the plurality of bulbs is actuatable to illuminate the respective bottle of the plurality of bottles.

13. The railing assembly of claim 1, wherein each bottle of the plurality of bottles has a height being complementary to a distance between adjacent shelves of the plurality of shelves wherein each bottle of the plurality of bottles extends between the adjacent shelves of the plurality of shelves.

14. A railing assembly comprising:

a frame including:

a plurality of shelves being spaced from each other by an equivalent distance, the plurality of shelves being parallel to each other, the plurality of shelves including:

a top shelf having an upper surface and a lower surface, the top shelf having a pair of opposing lateral ends;

a bottom shelf having a length being equal to a length of the top shelf, the bottom shelf having a top surface and a bottom surface; and a plurality of intermediary shelves being positioned between the top shelf and the bottom shelf, each intermediary shelf of the plurality of intermediary shelves having a length being less than a length of the top shelf, each shelf of the plurality of shelves having an upward surface and a downward surface; and a pair of side walls being coupled to and extending between the plurality of shelves wherein the pair of side walls secure a position of the plurality of shelves relative to each other, the pair of side walls being perpendicular to the plurality of shelves, each side wall of the pair of side walls including:

an outer surface being coplanar with a respective opposing lateral end of the pair of opposing lateral ends of the top shelf; and an inner surface being coupled to each intermediary shelf of the plurality of intermediary shelves;

a plurality of bottles being coupled to the frame wherein the frame surrounds the plurality of bottles, each bottle of the plurality of bottles being translucent to facilitate visibility through each bottle of the plurality of bottles, each bottle of the plurality of bottles having a height being complementary to a distance between adjacent shelves of the plurality of shelves wherein each bottle of the plurality of bottles extends between the adjacent shelves of the plurality of shelves, each bottle of the plurality of bottles including:

a base wall; and a peripheral wall extending upwardly from the base wall, the peripheral wall having an upper edge defining an opening into each bottle of the plurality of bottles;

a plurality of lights being coupled to the frame wherein the plurality of lights are actuatable to illuminate the plurality of bottles, each light of the plurality of lights including:

a bulb being smaller than the opening extending into a respective bottle of the plurality of bottles wherein the bulb is positioned within the respective bottle of the plurality of bottles through the opening whereby the bulb is actuatable to illuminate the respective bottle of the plurality of bottles, the bulb being one of a plurality of bulbs; and a wire being coupled to the bulb, the wire being electrically conductive wherein the wire is configured to transfer power to the bulb to actuate the bulb, the wire extending between the plurality of bulbs wherein the wire electrically couples the plurality of bulbs to each other;

a plurality of indentations extending into the plurality of shelves wherein the plurality of indentations secure a position of each bottle of the plurality of bottles within the frame, the plurality of indentations being vertically aligned with each other wherein the plurality of bottles are vertically aligned with each other within the frame, the plurality of indentations being equidistantly spaced from each other along a length of each shelf of the plurality of shelves wherein the plurality of bottles are equidistantly spaced from each other along the length of each shelf of the plurality of shelves, the plurality of indentations including:

a plurality of bottom indentations having a shape being complementary to a shape of the base wall of each bottle of the plurality of bottles wherein the base wall of each bottle of the plurality of bottles is positioned within an associated bottom indentation of the plurality of bottom indentations to secure a position of the base wall of each bottle of the plurality of bottles on the plurality of shelves, the plurality of bottom indentations being positioned on the top surface of the bottom shelf, the plurality of bottom indentations being positioned on the upward surface of each intermediary shelf of the plurality of intermediary shelves; and a plurality of top indentations having a shape being complementary to a shape of the upper edge of the peripheral wall of each bottle of the plurality of bottles wherein the upper edge of the peripheral wall of each bottle of the plurality of bottles is positioned within a respective top indentation of the plurality of top indentations to secure a position of the upper edge of the peripheral wall of each bottle of the plurality of bottles on the plurality of shelves, the plurality of top indentations being positioned on the lower surface of the top shelf, the plurality of top indentations being positioned on the downward surface of each intermediary shelf of the plurality of intermediary shelves;

a plurality of channels extending into the plurality of shelves wherein the plurality of channels extend through the plurality of top indentations of the plurality of indentations, the plurality of channels having a size being complementary to a size of the wire of each light of the plurality of lights wherein the wire of each light of the plurality of lights is positioned within a respective channel of the plurality of channels, the plurality of channels being positioned on the lower surface of the top shelf, the plurality of channels being positioned on the downward surface of each intermediary shelf of the plurality of intermediary shelves;

a pair of crevasses extending into the pair of side walls of the frame wherein each crevasse of the pair of crevasses is positioned on the inner surface of a respective side wall of the pair of side walls, each crevasse of the pair of crevasses having a size being complementary to a size of the wire of each light of the plurality of lights wherein the wire of each light of the plurality of lights is positioned within a respective crevasse of the pair of crevasses to electrically couple the plurality of lights on each shelf of the plurality of shelves to the plurality of lights on the adjacent shelves of the plurality of shelves; and the frame being one of a plurality of frames being coupled together, the plurality of frames being configured for coupling to a surface wherein the plurality of frames extend upwardly from the surface to define a partition on the surface and wherein the upper surface of the top shelf of the plurality of shelves defines a hand rail on the partition.

* * * * *